United States Patent [19]
Siegenthaler

[11] Patent Number: 6,039,825
[45] Date of Patent: Mar. 21, 2000

[54] METHOD OF FORMING A COMPLETE TIRE CARCASS

[75] Inventor: Karl J. Siegenthaler, Pratteln, Switzerland

[73] Assignee: Bridgestone Corporation, Tokyo, Japan

[21] Appl. No.: 09/094,000

[22] Filed: Jun. 9, 1998

[51] Int. Cl.[7] ............................................. B29D 30/08
[52] U.S. Cl. ........................ 156/111; 156/126; 156/127; 156/398; 156/406.2
[58] Field of Search ................................. 156/111, 126, 156/127, 135, 117, 396, 406.2, 398, 403

[56] References Cited

U.S. PATENT DOCUMENTS

| | | | |
|---|---|---|---|
| 3,713,929 | 1/1973 | Botasso et al. | 156/127 |
| 4,738,738 | 4/1988 | Holroyd et al. | 156/129 |
| 5,304,270 | 4/1994 | Siegnethaler | 156/127 |
| 5,380,384 | 1/1995 | Tokunaga et al. | 156/111 |
| 5,512,115 | 4/1996 | Siegenthaler | 156/126 |
| 5,650,034 | 7/1997 | Siegenthaler | 156/396 |

FOREIGN PATENT DOCUMENTS

| | | |
|---|---|---|
| 0 661 150 A2 | 7/1995 | European Pat. Off. . |
| 929777 | 6/1963 | United Kingdom . |

*Primary Examiner*—Geoffrey L. Knable
*Attorney, Agent, or Firm*—John M. Vasuta; Michael Sand

[57] ABSTRACT

A method of forming a complete carcass of a tire, whereby an inner carcass (5) of the tire, formed on a collapsible forming device (2) supporting the beads (8) of the inner carcass (5), is inserted, together with the collapsible forming device (2), inside a toroidal body (19) supporting, internally, an outer carcass (9); is made to adhere to the outer carcass (9) to form the complete carcass; is clamped with respect to the toroidal body (19) by means of a pair of fastening rings (24) fitted laterally to the toroidal body (19) and having radial arms (26) for supporting and clamping the two beads (8); and, finally, is detached from the forming device (2) by collapsing and extracting the forming device (2) from the toroidal body (19).

6 Claims, 4 Drawing Sheets

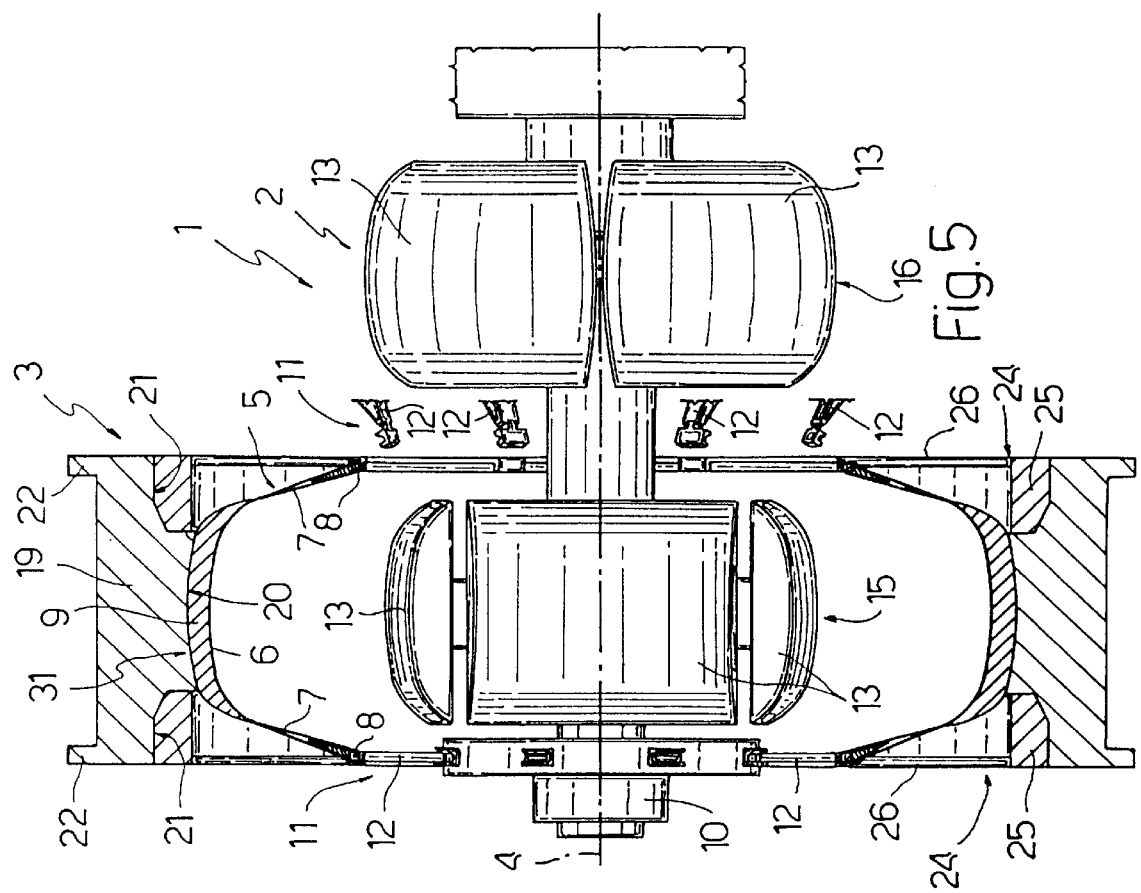
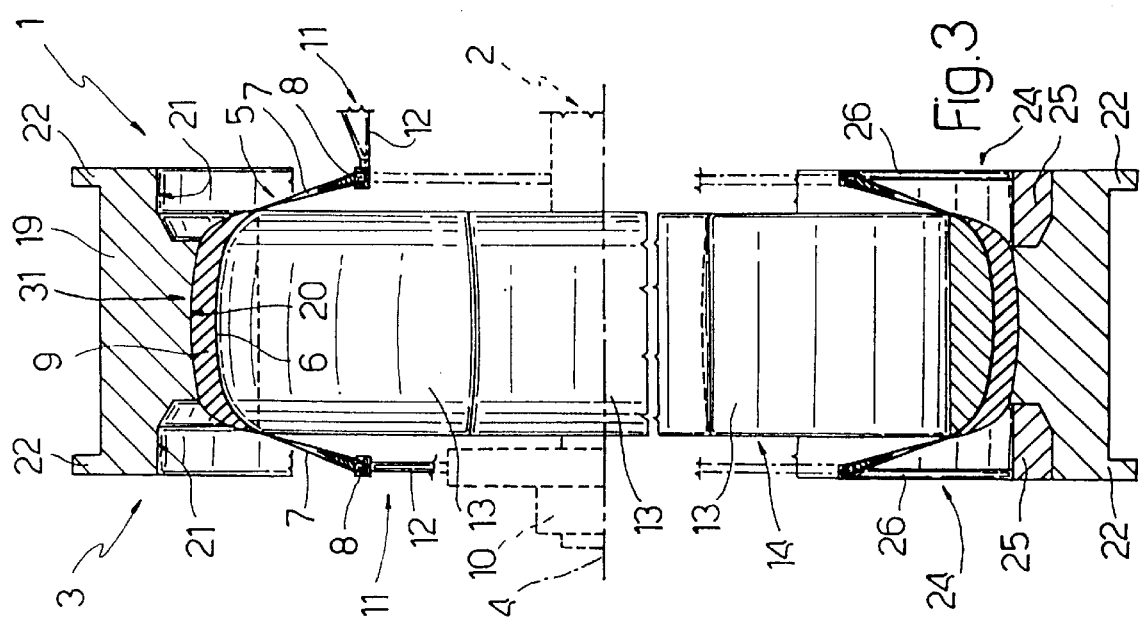

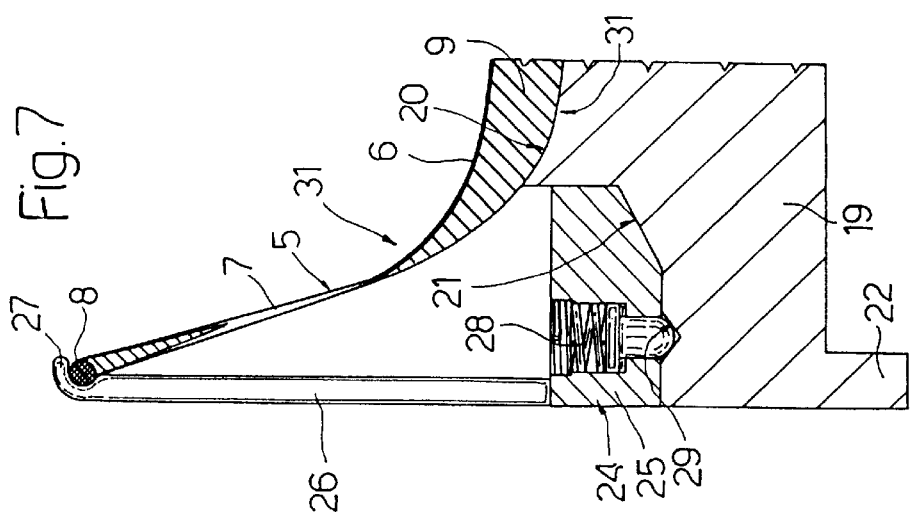
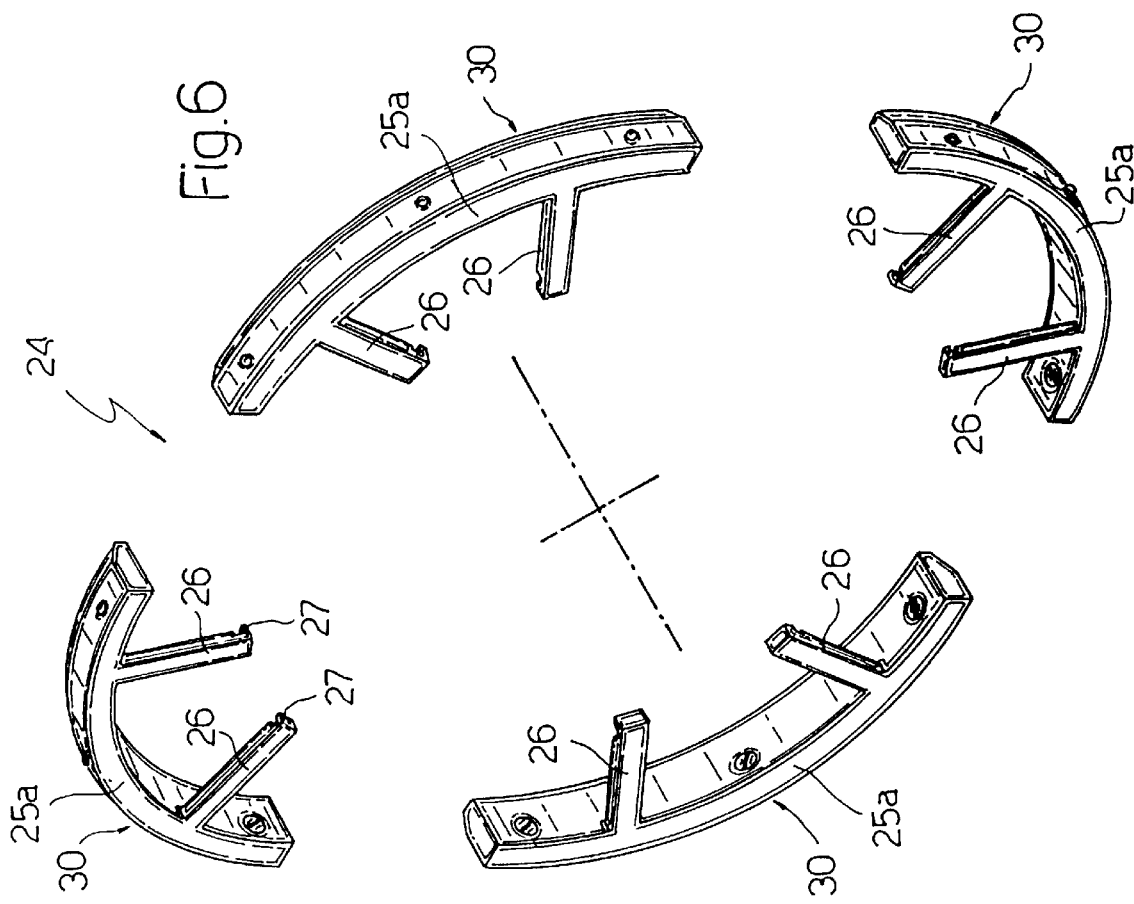

METHOD OF FORMING A COMPLETE TIRE CARCASS

BACKGROUND OF THE INVENTION

1. Technical Field

The present invention relates to a method of forming a complete tire carcass.

More specifically, the present invention relates to a method of forming a complete carcass by connecting an inner carcass to an outer carcass comprising a tread and, preferably, a reinforced tread belt.

2. Background Information

Radial tires are known to be produced by forming the outer carcass on the inner surface of a toroidal body; forming the inner carcass separately on a special forming device; inserting the inner carcass inside the toroidal body and onto the inner surface of the outer carcass to form the complete carcass; detaching the inner carcass from the forming device; and separating the forming device from the toroidal body.

The toroidal body defines the central portion of a forming mold, which, prior to the curing process, is closed by a pair of lateral plates normally supporting the sidewalls of the tire.

The inner carcass is also known to be formed using a device comprising a central shaft; a collapsible annular element fitted to the central shaft and supporting an intermediate portion of the inner carcass; and two rings of radially movable arms for clamping, with respect to the central shaft, two beads incorporated in two flexible lateral walls of the inner carcass.

The above device provides for inserting the inner carcass inside the toroidal body, radially expanding the annular element so that the inner carcass adheres to the outer carcass to define a complete carcass, and releasing the complete carcass by collapsing the annular element and withdrawing the arms supporting the beads.

The above tire forming method involves several drawbacks owing to the fact that, in the interim between detaching the complete carcass from the forming device and applying the lateral plates to the toroidal body prior to curing the tire, the beads are free to oscillate axially on account of the poor rigidity of the lateral walls of the inner carcass.

SUMMARY OF THE INVENTION

It is an object of the present invention to perfect the above known method to eliminate the aforementioned drawback.

According to the present invention, there is provided a method of forming a complete tire carcass; the complete carcass comprising an inner carcass and an outer carcass; the inner carcass comprising an annular intermediate portion, two flexible lateral walls, and two annular beads located on either side of said intermediate portion and each connected to a respective said lateral wall; the inner carcass being formed on a forming device comprising collapsible supporting means for supporting said beads and said intermediate portion; the outer carcass being formed in a central toroidal body of a forming mold; and the method comprising the steps of inserting the inner carcass inside said toroidal body by means of said forming device; causing said intermediate portion to adhere to said outer carcass to form said complete carcass; detaching the complete carcass from the forming device by collapsing said supporting means; and extracting said forming device from said toroidal body; and being characterized by also comprising the further step of clamping said beads in a fixed position with respect to said toroidal body prior to extracting said forming device from the toroidal body.

According to a preferred embodiment of the above method, said step of clamping said beads in a fixed position is performed by fitting said toroidal body laterally with a pair of annular elements comprising rigid radial arms connectable to said beads to secure the beads to the toroidal body.

BRIEF DESCRIPTION OF THE DRAWINGS

A non-limiting embodiment of the present invention will be described by way of example with reference to the accompanying drawings, in which:

FIG. 3 shows a larger-scale section, with parts removed for clarity, along line III—III in FIG. 2;

FIG. 5 shows a larger-scale section along line V—V in FIG. 4;

FIG. 6 shows an exploded view in perspective of a detail in FIG. 1;

FIG. 7 shows a larger-scale view of a detail in FIG. 5.

DESCRIPTION OF THE PREFERRED EMBODIMENT

Figure 1:
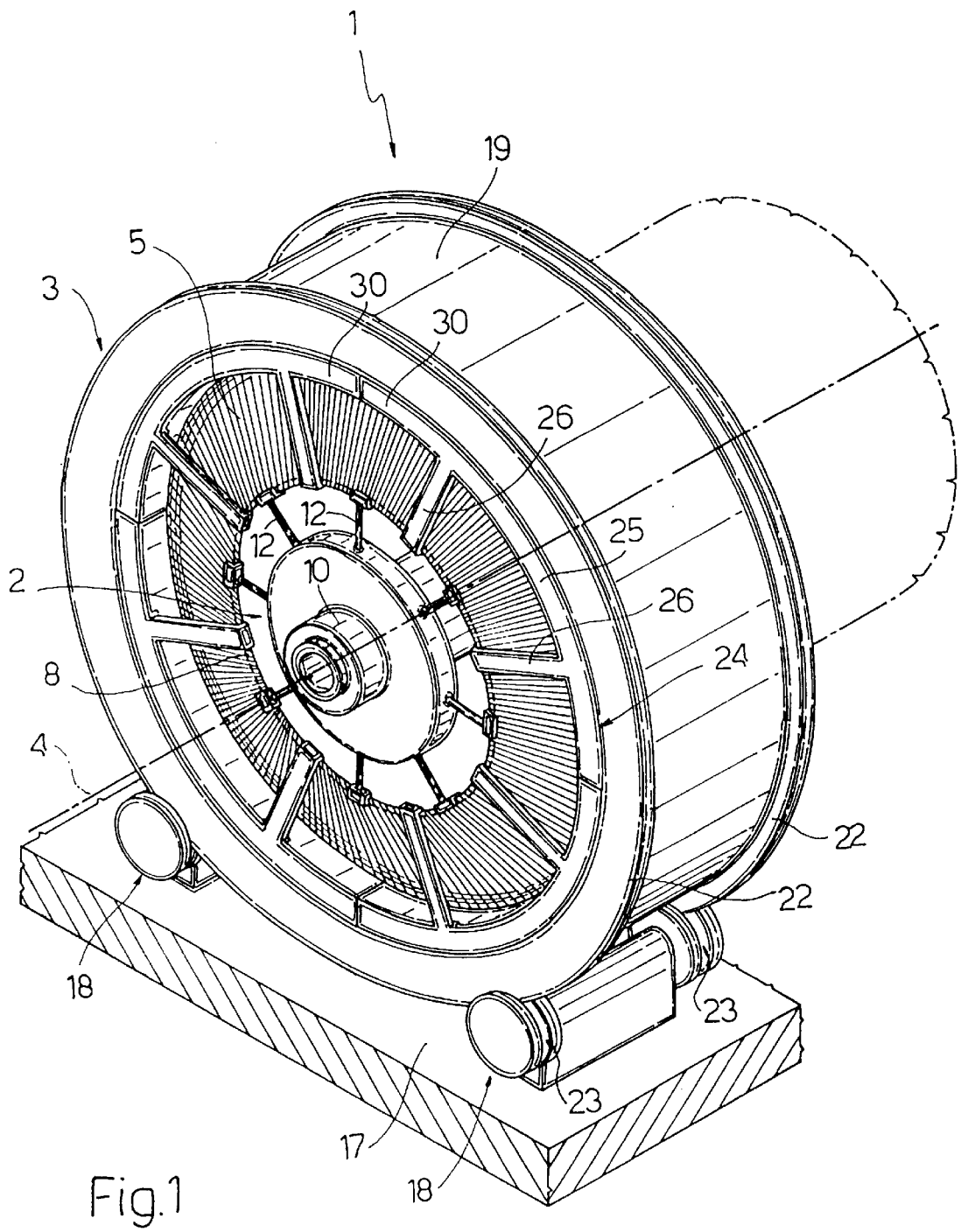
FIG. 1 shows a view in perspective of a forming assembly for forming a complete tire carcass according to the method of the present invention.

Number 1 in FIG. 1 indicates an assembly for forming a radial tire (not shown) and comprising two forming devices 2, 3 connected to each other coaxially with a common axis 4. Device 2 is a known device for forming an inner carcass 5 comprising, as shown in FIGS. 3 and 5, an intermediate annular portion 6, and two flexible lateral walls 7, each incorporating a respective bead 8; and device 3 is a device for forming and transferring an outer carcass 9 (FIGS. 3 and 5) normally comprising a reinforced tread belt (not shown) and an annular tread (not shown).

With reference to FIGS. 3 and 5, device 2 comprises a central shaft 10 coaxial with axis 4 and rotated about axis 4 by a motor (not shown); and two rings 11 of arms 12 arranged about axis 4 and movable between a collapsed rest position (FIG. 5) and an expanded operating position (FIG. 3) in which arms 12 of each ring 11 support a respective bead 8 in a fixed position with respect to axis 4. Finally, device 2 comprises a number of segments 13 defining, in the extracted position shown in FIGS. 2 and 3, an annular body 14 coaxial with shaft 10 and for supporting annular portion 6 of inner carcass 5.

Figure 4:
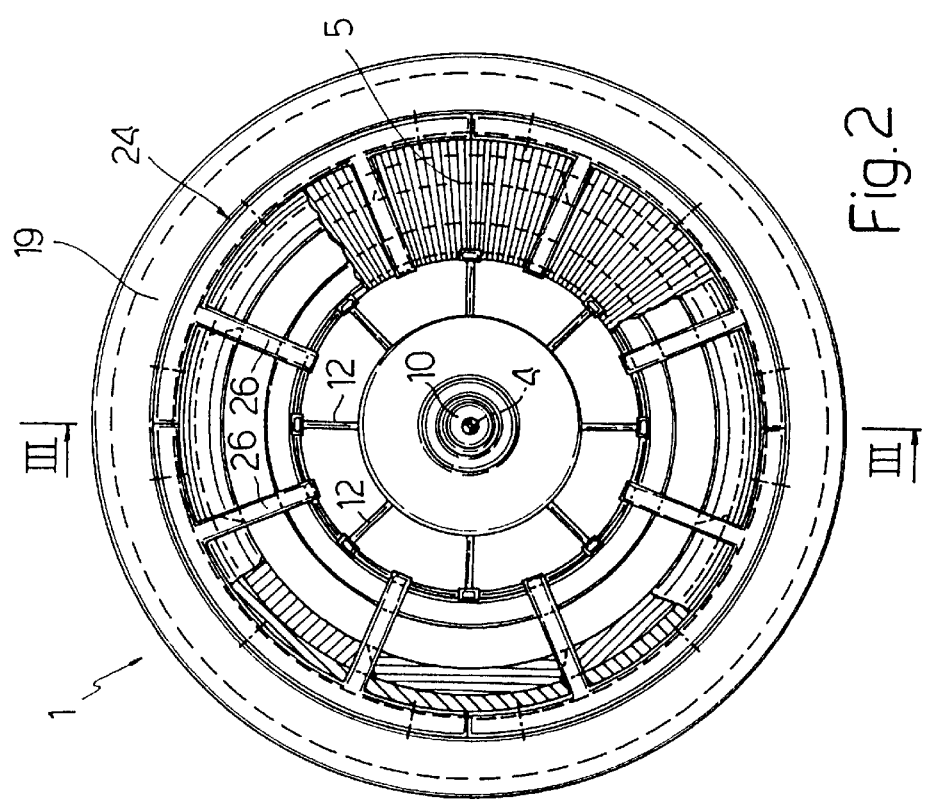
FIG. 4 shows the FIG. 2 assembly in a different operating position.

Segments 13 are fitted in known manner to respective actuators (not shown) for moving segments 13 between said extracted position and a withdrawn position FIGS. 4 and 5) in which segments 13 are divided into two groups to define two annular bodies 15 and 16 of a radius smaller than the inner radius of beads 8. The actuators (not shown) are also designed in known manner for additional travel to move segments 13 beyond the extracted position.

With reference to FIG. 1, device 3 comprises a platform 17 movable in known manner (not shown) in a respective horizontal plane; a roller saddle 18 adjustable in width and supported on platform 17; and a toroidal body 19 for housing outer carcass 9, and which is supported on saddle 18 so as to rotate about a respective axis coincident with axis 4.

Body 19 is defined in known manner by the central portion of a mold (not shown) for curing the tire (not shown), and comprises an inner toroidal surface 20 (FIGS. 3 and 5) which contacts the outer surface of outer carcass 9, and which in turn comprises two lateral annular grooves 21 (shown more clearly in FIG. 7), each for receiving an outer peripheral portion of a respective lateral plate (not shown) for closing the curing mold (not shown).

Body 19 also comprises two annular flanges 22 extending radially outwards from opposite axial ends of body 19 and for engaging respective grooves 23 in the rollers of saddle 18, as shown in FIG. 1.

Figure 2:
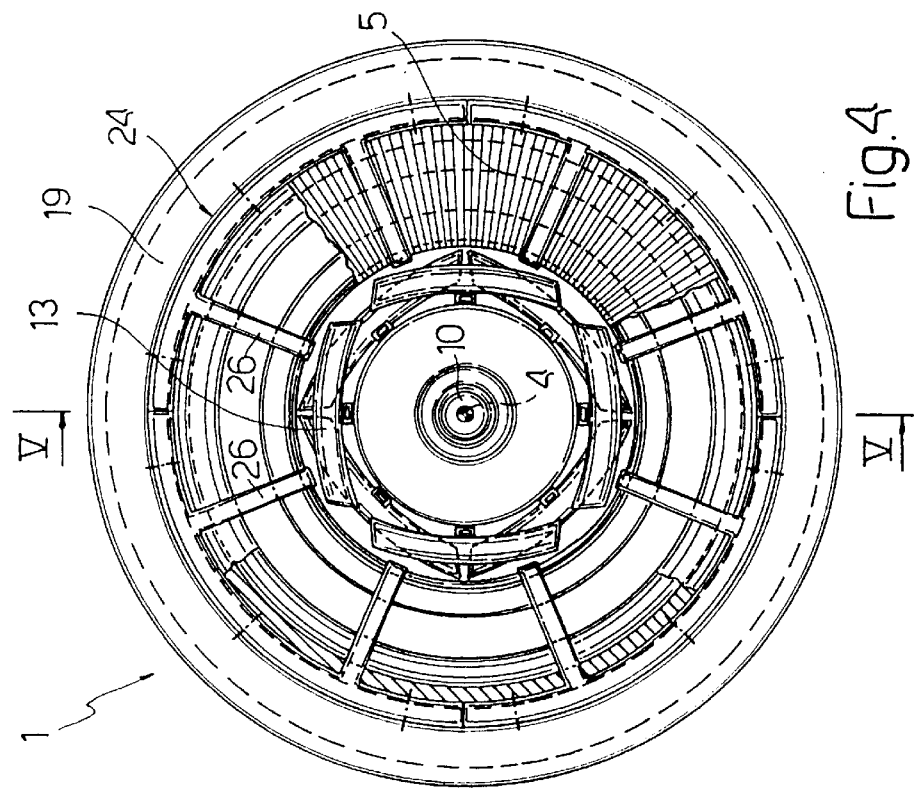
FIG. 2 shows a front view, with parts removed for clarity, of the FIG. 1 forming assembly.

Assembly 1 also comprises a pair of annular elements 24 for fastening beads 8, and which are fitted laterally to body 19, inside grooves 21, before fitting on the lateral plates (not shown). Each element 24 comprises a circular outer body 25 for engaging a respective groove 21; and a number of rigid radial arms 26 extending inwards of respective outer body 25 and equal in number to arms 12 in each ring 11 (as shown in FIG. 2). As shown more clearly in FIG. 7, the free end of each arm 26 comprises a hook 27, which is engaged by a respective portion of respective bead 8 to clamp bead 8 with respect to body 19.

As shown in FIG. 7, each element 24 is fixed axially and releasably to body 19 by means of a number of radial spring pins 28, each engaging an annular groove 29 formed in the bottom of respective groove 21.

As shown in FIG. 6, each element 24 is defined by four identical sectors 30, each of which is fitted separately to body 19 and comprises a pair of arms 26 and a portion 25a of outer body 25.

In actual use, inner carcass 5 and outer carcass 9 are formed separately in known manner on respective devices 2 and 3. More specifically, when forming inner carcass 5, device 2 is set with segments 13 in said extracted position supporting portion 6 of inner carcass 5, and with arms 12 in the operating position supporting beads 8.

Once inner carcass 5 and outer carcass 9 are formed, devices 2 and 3 are aligned along axis 4, and device 2 is moved axially to position inner carcass 5 centrally inside toroidal body 19. Insertion of device 2 inside body 19 is assisted by slightly withdrawing segments 13 to reduce the outside diameter of inner carcass 5.

Once inner carcass 5 is positioned inside body 19, the actuators (not shown) of segments 13 are activated to perform said additional travel and move segments 13 into the full extraction position, in which segments 13 compress portion 6 of inner carcass 5 against the inner surface of outer carcass 9 to form a complete carcass 31.

With the formation of complete carcass 31, inner carcass 5 is integral with body 19 and may therefore be detached from device 2. However, to prevent lateral walls 7 of inner carcass 5 from oscillating freely and so allowing beads 8 to oscillate along axis 4, beads 8 are clamped to body 19 before detaching inner carcass 5 from device 2.

For which purpose, before withdrawing arms 12, sectors 30 of annular elements 24 are clicked inside grooves 21, and hooks 27 of arms 26 are hooked onto the relative beads 8. More specifically, each sector 30 is assembled by first hooking hooks 27 of respective arms 26 onto the relative bead 8, and then clicking respective portion 25a inside the relative groove 21. Arms 26 are offset angularly with respect to arms 12 of device 2 (as shown in FIG. 2) so as to "hook" onto free portions of relative beads 8.

Device 2 is then detached from inner carcass 5 by withdrawing segments 13 to collapse body 14, and by moving arms 12 towards axis 4 to collapse rings 11, and is finally withdrawn from body 19 by moving devices 2 and 3 axially with respect to each other along axis 4.

The complete carcass 31 is therefore supported in fixed manner by device 3, and may be transferred easily to follow-up processing stations with no danger of oscillation of its component parts, in particular lateral walls 7 and beads 8.

I claim:

1. A method of forming a complete tire carcass; the complete carcass comprising an inner carcass and an outer carcass; the inner carcass comprising an annular intermediate portion, two flexible lateral walls, and two annular beads located on either side of said intermediate portion and each connected to a respective said lateral wall; the inner carcass being formed on a forming device comprising collapsible supporting means for supporting said beads and said intermediate portion; the outer carcass being formed in a central toroidal body of a forming mold; and the method comprising the steps of inserting the inner carcass inside said toroidal body by means of said forming device; causing said intermediate portion to adhere to said outer carcass to form said complete carcass; detaching the complete carcass from the forming device by collapsing said collapsible supporting means; and extracting said forming device from said toroidal body; and being characterized by also comprising the further step of clamping said beads in a fixed position with respect to said toroidal body prior to extracting said forming device from the toroidal body.

2. A method as claimed in claim 1, characterized in that said step of clamping said beads in a fixed position is performed by fitting said toroidal body laterally with a pair of annular elements comprising rigid radial arms connectable to said beads to secure the beads to the toroidal body.

3. A method as claimed in claim 2, characterized in that said toroidal body comprises a pair of lateral circumferential grooves, and each said annular element comprises a circular body for fitment to said toroidal body; said arms projecting radially inwards from said circular body and comprising respective engaging means for engaging the relative said bead; and said annular elements being applied by engaging said beads by means of said engaging means, and inserting said circular bodies inside said grooves.

4. A method as claimed in claim 3, characterized in that said annular elements are clicked releasably onto said toroidal body.

5. A method as claimed in claim 3, characterized in that each of said annular elements is divided into sectors, which are fitted separately and successively to said toroidal body.

6. A method as claimed in claim 3, characterized in that said collapsible supporting means comprise an annular supporting body for supporting said intermediate portion, and two rings of supporting arms for supporting said beads; the radial arms of each said annular element being positioned angularly offset with respect to the relative arms.

* * * * *